No. 748,842. Patented January 5, 1904.

UNITED STATES PATENT OFFICE.

JOSEPH CADOTTE, OF SUNCOOK, NEW HAMPSHIRE.

CASE-HARDENING COMPOUND.

SPECIFICATION forming part of Letters Patent No. 748,842, dated January 5, 1904.

Application filed April 16, 1903. Serial No. 152,836. (No specimens.)

*To all whom it may concern:*

Be it known that I, JOSEPH CADOTTE, a citizen of the United States, residing at Suncook, in the county of Merrimack and State of New Hampshire, have invented certain new and useful Improvements in Case-Hardening Compounds; and I do hereby declare the following to be a full, clear, and exact description of the invention, such as will enable others skilled in the art to which it appertains to make and use the same.

My invention relates to an improved compound for employment in the operation of case-hardening metals and implements, especially steel and steel articles.

My improved compound, which is in the form of a dry powder, consists of the following ingredients in or about the proportions stated, which proportions are, in quantity: white calcined plaster or plaster-of-paris, forty per cent.; prussiate of potash, forty per cent.; lampblack, twenty per cent.

The ingredients before being mixed are each ground to a fine condition, and the finely-divided ingredients are then thoroughly mixed together, and the compound is ready for use.

In the use of the compound the metal or implement is first heated to the required degree of temperature and is then coated with the compound by immersion or otherwise, the compound adhering to the surface. The heat from the coated metal or implement causes what may be termed a "boiling" action on the compound, which is allowed to continue for a few seconds, during which time the compound acts upon the metal to case-harden it. The calcined plaster and prussiate of potash combine to produce an annealing effect on the metal and to retard its cooling to permit the lampblack (carbon) to penetrate the surface sufficiently to give hardness and toughness without the objectionable quality of brittleness.

One advantage possessed by tools treated with my improved compound is the tendency to retain their temper while being subjected to high temperatures in use—as, for instance, in the treatment by tools of metal while in a heated condition.

I claim as my invention—

A case-hardening dry compound composed of forty per cent. of white calcined plaster, forty per cent. of prussiate of potash and twenty per cent. of lampblack.

In testimony whereof I affix my signature in presence of two witnesses.

JOSEPH CADOTTE.

Witnesses:
 A. W. THOMPSON,
 B. E. THOMPSON.